(12) United States Patent
Ingram et al.

(10) Patent No.: US 6,706,845 B2
(45) Date of Patent: Mar. 16, 2004

(54) LOW FORMALDEHYDE EMISSION PHENOL-FORMALDEHYDE RESIN AND METHOD FOR MANUFACTURE THEREOF

(75) Inventors: W. Hayes Ingram, Conyers, GA (US); Ted M. McVay, Lawrenceville, GA (US); Mary Letchas, Conyers, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 09/989,692

(22) Filed: Nov. 21, 2001

(65) Prior Publication Data

US 2003/0096937 A1 May 22, 2003

(51) Int. Cl.$^7$ ............................. C08G 14/04; C08G 8/10
(52) U.S. Cl. ..................... 528/129; 528/137; 528/162; 528/163
(58) Field of Search .................. 528/129, 137, 528/162, 163

(56) References Cited

U.S. PATENT DOCUMENTS

| 4,060,504 A | 11/1977 | Higginbottom |
| 5,916,966 A | 6/1999 | Walisser |
| 6,194,512 B1 | 2/2001 | Chen et al. |

FOREIGN PATENT DOCUMENTS

| EP | 0 913 413 A1 | 5/1999 |
| WO | WO 00/78834 A1 | 12/2000 |

OTHER PUBLICATIONS

International Search Report dated Mar. 25, 2003.

*Primary Examiner*—Duc Truong
(74) *Attorney, Agent, or Firm*—Banner & Witcoff, Ltd.

(57) ABSTRACT

Phenol formaldehyde resins that have low free formaldehyde when produced, that maintain their low free formaldehyde levels during storage, and that demonstrate low levels of formaldehyde emissions during processing, curing, and thereafter.

18 Claims, No Drawings

LOW FORMALDEHYDE EMISSION PHENOL-FORMALDEHYDE RESIN AND METHOD FOR MANUFACTURE THEREOF

FIELD OF THE INVENTION

This invention relates to low free formaldehyde and low formaldehyde emission phenol formaldehyde resins. In particular, this invention relates to phenol formaldehyde resins that have low free formaldehyde when produced, that maintain their low free formaldehyde levels during storage, and that demonstrate low levels of formaldehyde emissions during processing, curing, and thereafter.

BACKGROUND OF THE INVENTION

Phenol aldehyde resins have many commercially important uses. Resins having various mole ratios of aldehyde to phenol are known in the industry, and are selected to provide desired characteristics, depending upon the intended use of the resin.

Resole resins, i.e., those resins formed by the condensation of a phenol with an aldehyde in the presence of alkaline catalyst, are an important class of phenol aldehyde resins. Because resole resins are hardened by heat, they often are used as a binder which is applied to a substrate, then hardened by application of heat, often under pressure.

Phenol formaldehyde resole resins are a particularly important class of phenol aldehyde resole resins. Phenol formaldehyde resole resins often are used as binders, e.g., for manufactured boards, chipboard products, fibrous products, or laminated products. Resins for laminated products must exhibit properties and characteristics, such as good substrate penetration, and produce laminates with good dimensional stability, good postformability, low panel warpage, low water absorption and high thermal blister resistance, that other resins need not exhibit. However, such known resins have formaldehyde levels which cause formaldehyde to be released into the environment during processing, storage of the treated substrate, and cure. Such formaldehyde release is undesirable, particularly in an enclosed place. Formaldehyde may be inhaled by workers and may come in contact with the eyes, the mouth, and other parts of the body. Formaldehyde is malodorous, and is thought to contribute to human and animal illnesses. Therefore, it is desirable to reduce the level of free formaldehyde in resins and the release of formaldehyde during processing of such resins into the environment.

Formaldehyde is not the only component that may be undesirably released into the atmosphere from a phenol-formaldehyde resin. For example, phenol also may be released into the environment. Thus, any measures taken to reduce free formaldehyde in the neat resin and formaldehyde emissions during processing, cure, and use desirably do not increase, and preferably decrease, phenol emissions. Traditionally, reductions in free phenol levels have been most easily achieved by increasing the formaldehyde to phenol molar ratio. However, this usually tends to increase the level of free formaldehyde in the resin and thus increase the amount of formaldehyde released during processing and cure. A process that can significantly reduce the free formaldehyde in a resin and the formaldehyde emissions during processing can therefore allow the use of higher molar ratio resins to, in turn, reduce free phenol levels and phenol emissions during processing.

Various techniques have been used to reduce free formaldehyde in and formaldehyde emissions from formaldehyde-based resins. In particular, various formaldehyde scavengers (i.e., chemicals usually added to the resin during or after its preparation) have been used in an attempt to reduce formaldehyde emissions. Use of a formaldehyde scavenger, particularly at high levels, often is undesirable, however, not only because of the additional cost, but also because it can adversely affect the characteristics or properties of the cured resin and therefore the finished product made with the resin.

It is also well known that formaldehyde emissions can, in part, be controlled by the addition of free urea to an uncured resin system. Urea often is selected because it is inexpensive compared with other formaldehyde scavengers. Urea acts as a formaldehyde scavenger both during, and subsequent to, the manufacture of the resin. It can be added by the resin manufacturer or prior to use by the end user to scavenge residual free formaldehyde. Urea typically is added directly to phenol formaldehyde resin to produce a urea-extended phenol formaldehyde resole resin. The resin can be further treated or applied as a coating or binder, as desired, and then cured. These resins typically are used in, for example, the insulation industry as part of an adhesive for glass fibers. In an insulation application, the urea addition also contributes to improved anti-punk characteristics for the cured binder. However, in laminating applications, urea in quantity sufficient to yield very low free formaldehyde and formaldehyde emissions degrades laminate performance, as water resistance is decreased and laminate high-temperature blister time performance is reduced. Similarly, use of ammonia in such quantities has a deleterious effect on storage stability.

Other formaldehyde scavengers commonly used include dicyandiamide and melamine. However, these scavengers are expensive and add significantly to the cost of the resin. They also can have solubility/compatability problems in the phenol-formaldehyde resin at high levels of scavenger addition.

Even when a combination of formaldehyde scavengers is utilized at the end of the resin A-stage manufacturing process in an attempt to reduce free formaldehyde and ameliorate formaldehyde emissions during B- and C-stage processing while minimizing the adverse effects on the resin, these scavengers leave much to be desired when added to a completed A-stage resin. Typically, the free formaldehyde in the resin can be low initially, i.e., less than 0.10%, but it can increase significantly over 24 to 48 hours. Typically, resins utilizing scavengers in this manner exhibit free formaldehyde levels that can increase into the 0.25–1.0% range over several days.

Another technique for lowering formaldehyde emission levels is to use relatively high catalyst levels. While higher catalyst levels reduce free formaldehyde levels, they do not, by themselves, reduce the total free formaldehyde to less than 0.10%.

Thus, there exists a need for a phenol formaldehyde resole laminating resin exhibiting low free formaldehyde in the resin and low formaldehyde emissions not only during processing but also during storage of treated substrate prior to the final processing (laminating) step. There also exists a need for a method for making such low formaldehyde emission resins.

SUMMARY OF THE INVENTION

The invention is directed to phenol formaldehyde resole laminating resin that exhibits low free formaldehyde immediately after manufacture; low formaldehyde emissions during the substrate treating process; and low formaldehyde emissions of the substrate during storage prior to final pressing and curing of the laminate. The invention also is directed to a method for making such a low formaldehyde emission resin.

DETAILED DESCRIPTION OF THE INVENTION

The invention is directed to a phenol formaldehyde resole laminating resin that exhibits low free formaldehyde during manufacture and cure, and low formaldehyde emissions during the substrate treating process and storage prior to final pressing and curing of the laminate. The invention also relates to a method for manufacturing the resin of the invention.

The inventors have discovered that use of a relatively large quantity of catalyst, as compared with the quantity used for typical laminating resins, in combination with the addition of one or more formaldehyde scavengers during later portions of the A-stage of the resin cook, yields a phenol formaldehyde resole resin having low free formaldehyde and low formaldehyde emissions during B- and C-stage resin processing and curing. Such resin is particularly adapted for use in manufacture of paper-based laminate products.

In accordance with the method of the invention, an A-stage phenol formaldehyde resin is prepared under alkaline conditions and in the presence of relatively large quantity of catalyst. After an initial cook, i.e., reaction of the ingredients at an elevated temperature, at least one formaldehyde scavenger is added and the A-stage reaction cook is completed. The resin then is vacuum distilled to obtain an A-stage resin having a desired end point, as described in detail below. During subsequent cooling to ambient temperature, a small quantity of an additional formaldehyde scavenger can be added. Additional processing steps also may be carried out, if desired.

The resole resin of the invention has a molar ratio of between about 1.20 and about 2.00 moles of formaldehyde per mole of phenol. Preferably, the molar F/P ratio is between about 1.30 and about 1.85. The molar ratio of formaldehyde scavenger to phenol is between about 0.02 and about 0.25 moles scavenger/mole phenol, preferably between about 0.05 and about 0.16 moles scavenger/mole phenol. The finished A-stage resin has between about 60 about 75 weight % solids, a viscosity of between about 100 and about 500 cps, a free phenol concentration of between about 2 and about 12 weight %, a free formaldehyde concentration of less than about 0.15 weight %, and a pH of between about 7.0 and about 9.0.

In accordance with the method of the invention, phenol and formaldehyde in desired proportion are introduced into a suitable reaction vessel. Alkaline catalyst then is introduced in a controlled manner and the temperature is increased to between about 70 and about 90° C., preferably about 75–85° C.

The starting ingredients can be added in any combination, and can be used in any physical form. However, skilled practitioners recognize that introduction of excessive quantities of water in, for example, aqueous solutions of starting ingredients, is undesirable, as it requires additional time and energy to remove the excess water. Thus, the physical form of starting ingredients should be chosen so as to minimize the additional time and energy required to remove excess water so that the finished product will provide the desired level of solids.

The quantity of catalyst used is between about 0.01 and about 0.1, preferably between about 0.03 and about 0.09, and more preferably between about 0.04 and about 0.07, moles per mole of phenol.

Skilled practitioners recognized that the temperature at which catalyst first is added may be varied, and that slower and faster rates of catalyst addition may be practiced. However, whereas lower starting temperatures and slower catalyst addition rates afford greater temperature control of the stirred mass, the total time required for reaction becomes commercially impractical. Alternatively, higher starting temperature and quicker catalyst addition rates reduce total processing time, but a greater risk of temperature excursions and poor control of reaction conditions exists. Typically, catalyst is introduced at a temperature below about 70° C. With the guidance provided herein, a skilled practitioner will be able to determine the temperature and duration of catalyst addition.

Any suitable alkaline catalyst can be used. Thus, skilled practitioners recognize that suitable catalysts include the oxides and hydroxide of alkali metals and alkaline earth metals, tertiary amines, and blends thereof. Preferred catalysts are sodium hydroxide, lime, sodium carbonate, dimethylaminoethanol, and potassium hydroxide. Often, these catalysts are added as aqueous solutions. However, as set forth above, unnecessary quantities of water need not be introduced.

Reaction is allowed to proceed for a time sufficient to yield a resin having a free formaldehyde content of less than about 0.5 weight %. Although one can determine the point in the resin preparation at which the free formaldehyde content has been reduced to less than 0.5 weight % by directly measuring the formaldehyde content of the resin, skilled practitioners recognize that other indicia of the condition of the resin are more reasonably measured. Such indicia, including, for example, viscosity, water dilutability, and free phenol, can be correlated with free formaldehyde and are more easily determined. Thus, typically an intermediate in-process control point selected from these and other indicia is utilized to indicate when the free formaldehyde content of less than 0.5 weight % is reached. This intermediate point is selected to allow sufficient time to add the scavenger(s) and react them into the resin before a final in-process control end point is reached. With the guidance provided herein, a skilled practitioner will be able to establish a suitable intermediate in-process control point.

Formaldehyde scavenger is added to this resin at a temperature above about 70° C. The temperature at which scavenger is added can be higher than about 70° C., and is dependent on how fast the reaction is proceeding and how close it is to its final in-process control end point. The final in-process control point is selected by the practitioner to yield a finished A-stage resin, in accordance with the guidance provided herein. One or more scavengers can be added, and plural scavengers can be added simultaneously or serially, with intervening reaction periods. Preferably, plural scavengers are added serially. Scavengers are selected from the group consisting of melamine, ammeline, urea, dicyandiamide, benzoguanamine, and acetoguanamine. Preferred scavengers are selected from the group consisting of melamine, urea, and dicyandiamide. More preferred scavengers are melamine and urea.

Skilled practitioners recognize that the solubility of some formaldehyde scavengers, particularly melamine, in the resin is very low or even zero, unless free formaldehyde is present. Thus, it is preferred to add such scavengers first, while the free formaldehyde concentration is at its highest. In this way, such scavenger is used efficiently, and it is not necessary, as it is when such scavenger is used as the sole scavenger, to filter unused scavenger solids from the resin.

Plural scavenger additions are carried out simultaneously or serially. If added serially, a short (about 5 to about 15 minutes) period of reaction is afforded between additions.

Formaldehyde scavenger may be added in any convenient form. However, excessive quantities of water preferably are avoided.

The resin cook then is continued at a temperature and for a time sufficient to provide an A-stage resin having the desired properties and characteristics. Resin of the invention has a free formaldehyde concentration of less than about 0.15 weight %, typically between about 0.03 and about 0.13 weight %, and a water dilutablity of less than about 4/1. The A-stage resin of the invention is advanced to a point at which the water dilutability is not infinite or to another process control end point as determined by viscosity, free phenol, free formaldehyde, molecular weight, or any combination thereof. As skilled practitioners recognize, phenol formaldehyde resin is infinitely dilutable with water at lesser condensation degrees, i.e., if the resin is not advanced sufficiently. However, A-stage resin of the invention is not infinitely dilutable with water. Rather, the dilutability is typically less than about 4/1, i.e., addition of more than four parts of water to one part of resin will cause formation of haze.

In accordance with the method of the invention, the resin is cooked at a temperature of between about 70 and 90° C., preferably about 75–85° C., to a final process control end point that provides the correct final properties necessary to perform in the end use application. For example, this final end point could be a water dilutability such as 2:1 or a viscosity of 80 centistokes, depending on the actual resin properties required to perform in the end use application.

At the end of the cook, the resin can be further treated or processed in ways known in the art. For example, the resin can be vacuum distilled, the pH can be adjusted (typically by addition of mineral or organic acids), or other ingredients, such as methanol, can be added.

Similarly, additional formaldehyde scavenger can be added. For example, a small quantity (less than about 0.5 weight %) of ammonia can be added, if desired. In accordance with the invention, it is possible to use such a relatively small quantity of ammonia. Such a small quantity of ammonia poses few environmental concerns, such as unpleasant odor and irritation, and does not deleteriously affect storage stability.

EXAMPLES

Example 1

Resin of the invention was prepared in accordance with the method of the invention, as follows, wherein all parts are parts by weight:

A glass reactor was loaded with 42.0 parts phenol and 44.3 parts of 50% formaldehyde aqueous solution. The ingredients were mixed and heated to 55° C. and 2.2 parts of 50% sodium hydroxide aqueous solution were added over 20 minutes. The temperature was allowed to rise to 75° C. over a 30-minute period, and was reacted at this temperature for 60 minutes. Then, 2.1 parts of melamine were added over 10 minutes and reacted for 10 more minutes, at which time 2.1 parts of urea were added over 10 minutes. The reaction mass was held for an additional 150 minutes at 75° C. to yield an A-stage resin.

The A-stage resin then was cooled to 50° C. and vacuum distilled to a refractive index of 1.5610. Then, 3.2 parts of methanol were added and the resin was further cooled to 30° C. Then, 0.4 parts of a 28% ammonia aqueous solution were added and mixed for 30 minutes. Finally, the pH was adjusted to 8.1 by addition of 3.7 parts of 18% hydrochloric acid aqueous solution.

The resultant resin had a non-volatile content of 66.3%, a viscosity of 220 cps, free phenol of 5.50%, and free formaldehyde of 0.057%. Resin samples then were analyzed by a tube furnace technique typical of those known to skilled practitioners to determine formaldehyde emissions during cure. Emissions from this resin were less than 0.10 percent formaldehyde, based on the weight of the neat resin.

We claim:

1. A resin that is not infinitely dilutable with water comprising the reaction product of
   a. the reaction product of phenol and formaldehyde introduced in a molar ratio of formaldehyde to phenol of between about 1.20 and about 2.0 reacted at a temperature of between about 70 and about 90° C. in the presence of between about 0.01 and about 0.1 moles of alkaline catalyst per mole of phenol to form a resin precursor having a free formaldehyde concentration of less than about 0.5 weight % and
   b. a formaldehyde scavenger in quantity sufficient and at a temperature of between about 70 and about 90° C. for a time sufficient to produce a resin having a free formaldehyde concentration of less than about 0.15 weight % in the resin.

2. The resin of claim 1 wherein the molar ratio of scavenger to phenol is between about 0.02 and about 0.25.

3. The resin of claim 2 wherein the molar ratio of scavenger to phenol is between about 0.05 and about 0.16.

4. The resin of claim 1 further having a free phenol concentration of between about 2 and about 12 weight %.

5. The resin of claim 1 wherein the catalyst is present in an amount between about 0.03 and about 0.09 moles per mole of phenol.

6. The resin of claim 1 wherein the catalyst is present in an amount between about 0.04 and about 0.07 moles per mole of phenol.

7. An A-stage phenol formaldehyde resole resin that is not infinitely dilutable with water having a free formaldehyde concentration less than about 0.15 weight %, said resin comprising the reaction product of
   a. the reaction product of phenol and formaldehyde in a molar ratio of formaldehyde to phenol of between about 1.20 and about 2.0 at a temperature of between about 70 and about 90° C. in the presence of between about 0.01 and about 0.1 moles of alkaline catalyst per mole of phenol to form a resin precursor having a free formaldehyde concentration of less than about 0.5 weight % and
   b. a formaldehyde scavenger.

8. The resin of claim 7 wherein the molar ratio of scavenger to phenol is between about 0.02 and about 0.25.

9. The resin of claim 8 wherein the molar ratio of scavenger to phenol is between about 0.05 and about 0.16.

10. The resin of claim 7 further having a free phenol concentration of between about 2 and about 12 weight %.

11. The resin of claim 7 wherein the catalyst is present in an amount between about 0.03 and about 0.09 moles per mole of phenol.

12. The resin of claim 7 wherein the catalyst is present in an amount between about 0.04 and about 0.07 moles per mole of phenol.

13. A method for producing A-stage phenol formaldehyde resole resin that is not infinitely dilutable with water comprising a. reacting phenol and formaldehyde introduced into a reactor in a molar ratio for formaldehyde to phenol of between about 1.2 and about 2.0 at a temperature between about 70 and about 90° C. in the presence of between about 0.01 and about 0.1 moles of alkaline catalyst per mole of phenol for a time sufficient to produce a resin precursor and b. reacting the resin precursor at a temperature above 70° C. with a formaldehyde scavenger in a quantity for a time sufficient to yield a resin having a free formaldehyde concentration of less than about 0.15 weight %.

14. The method of claim 13 wherein the molar ratio of scavenger to phenol is between about 0.02 and about 0.25.

15. The method of claim 14 wherein the molar ratio of scavenger to phenol is between about 0.05 and about 0.16.

16. The method of claim 13 further having a free phenol concentration of between about 2 and about 12 weight %.

17. The method of claim 13 wherein the catalyst is present in an amount between about 0.03 and about 0.09 moles per mole of phenol.

18. The method of claim 13 wherein the catalyst is present in an amount between about 0.04 and about 0.07 moles per mole of phenol.

* * * * *

UNITED STATES PATENT AND TRADEMARK OFFICE
CERTIFICATE OF CORRECTION

PATENT NO. : 6,706,845 B2
DATED : March 16, 2004
INVENTOR(S) : W. Hayes Ingram et al.

It is certified that error appears in the above-identified patent and that said Letters Patent is hereby corrected as shown below:

Title page,
Item [56], References Cited, U.S. PATENT DOCUMENTS, please insert the following:

| | | |
|---|---|---|
| --3,819,441 | 6/1974 | Fargo et al |
| 3,932,334 | 1/1976 | Deuzeman et al |
| Re.30,375 | 8/1980 | Deuzeman et al. |
| 4,028,365 | 6/1977 | Cavalla et al |
| 4,216,295 | 8/1980 | Dahms |
| 4,339,361 | 7/1982 | MacPherson et al |
| 4,525,492 | 6/1985 | Rastall et al |
| 5,011,886 | 4/1991 | Buschfeld et al |
| 5,473,012 | 12/1995 | Coventry et al |
| 5,578,371 | 11/1996 | Taylor et al |
| 5,612,405 | 3/1997 | Bainbridge et al |
| 5,646,219 | 7/1997 | Teodorczyk |
| 5,684,118 | 11/1997 | Breyer et al |
| 5,795,934 | 8/1998 | Parks |
| 5,847,058 | 12/1998 | Teodorczyk |
| 5,952,440 | 9/1999 | Walisser et al-- |

FOREIGN PATENT DOCUMENTS, please insert the following:

-- EP      0 277 926      8/1988 --

Signed and Sealed this

Thirtieth Day of November, 2004

JON W. DUDAS
*Director of the United States Patent and Trademark Office*